United States Patent [19]

Koscik

[11] 4,085,651
[45] Apr. 25, 1978

[54] PLASTIC FASTENER

[75] Inventor: Richard A. Koscik, Richton Park, Ill.

[73] Assignee: Illinois Tool Works Inc., Chicago, Ill.

[21] Appl. No.: 768,673

[22] Filed: Feb. 14, 1977

[51] Int. Cl.² ........................................... F16B 13/08
[52] U.S. Cl. ............................................ 85/72; 85/77; 85/84
[58] Field of Search .................. 85/72, 66, 73, 74, 75, 85/76, 77, 78, 80, 81, 82, 83, 84; 24/73 P, 73 PF, 73 PM

[56] References Cited

U.S. PATENT DOCUMENTS

| 1,751,818 | 3/1930 | Karitzky | 85/84 |
| 3,385,157 | 5/1968 | Rapata | 85/84 |
| 3,385,158 | 5/1968 | Morin | 85/77 |
| 3,417,438 | 12/1968 | Schuplin | 85/72 |
| 3,678,798 | 7/1972 | Van Niel | 85/81 |
| 3,933,076 | 1/1976 | Tanaka | 24/73 PF |

FOREIGN PATENT DOCUMENTS

| 710,238 | 9/1941 | Germany | 85/84 |
| 7768/69 | 7/1969 | Japan | 85/72 |

Primary Examiner—Marion Parsons, Jr.
Attorney, Agent, or Firm—Jack R. Halvorsen; Robert W. Beart

[57] ABSTRACT

A plastic fastener, for example, a one-piece plastic rivet having a head and a bifurcated oval shank and expander means capable of axial movement within a tapered bore traversing the head and shank. Each portion of the shank has a longitudinally disposed radial relief means that provides a buckle or hinge section having generally uniform radial thickness which opens into the tapered bore to provide pairs of edges falling on the surface of the bore which, when the edges are contacted by the expander means, may cause the shank portions to be moved radially and to be expanded circumferentially as well. Positive locking means are also provided for restricting movement of the expander means after driving it into the shank bore.

8 Claims, 7 Drawing Figures

PLASTIC FASTENER

BACKGROUND OF THE INVENTION

This invention relates to a fastener, preferably a one-piece plastic fastener, such as a rivet. It is well known in the art to provide a hollow fastener having a tapered internal bore passing through the head and shank for accepting a positively locked expander element. Such devices are found in the patents to Carno, U.S. Pat. No. 2,898,798; Rapata, U.S. Pat. No. 3,385,157 and Birmingham, U.S. Pat. No. 3,411,397. Each of these devices disclose a tapered internal bore in which the shank portions or prongs are radially expanded by a drive pin or screw, either separate or integrally molded, which when axially moved engages the tapered wall of the bore and radially expands the free ends of the shank portions or prongs outwardly beyond the surface of the apertured panel opposite the surface engaged by its head or against the side wall of a blind bore. The patents to Schuplin, U.S. Pat. No. 3,417,438 and Kearns, U.S. Pat. No. 2,542,144 are examples of fastening devices having impositive cam-like means located intermediate the extremities of the bore for impositively restricting movement of their expander element, while the patent to Rapata, U.S. Pat. No. 2,941,439 teaches the use of a resilient shouldered element carried by the extremity of the expander element for cooperative engagement with the ends of the prong sections.

SUMMARY OF THE INVENTION

The present invention relates to a one-piece plastic fastener, preferably in the form of a plastic rivet, in which the shank is bifurcated and includes two or more shank portions or prongs which have longitudinally disposed radial relief means generally in the form of a secondary slot means radially disposed and communicating with a tapered bore through a portion of the prong length while other slot means opens through the outer periphery for the balance of the prong length. A suitable expander, i.e. a drive pin, when driven axially, will expand the free end of the prongs or shank portions with a rigid positive locking means being provided internally in the bore for retaining the drive pin against axial movement after being driven.

Therefore, it is an object of the present invention to provide an economical, easily fabricated, one-piece plastic fastener having a birfurcated shank and positively locked expander means, either integral or separate.

Other objects will be apparent to those skilled in the art when the specification is read in conjunction with the attached drawings.

DETAILED DESCRIPTION

Figure 1:
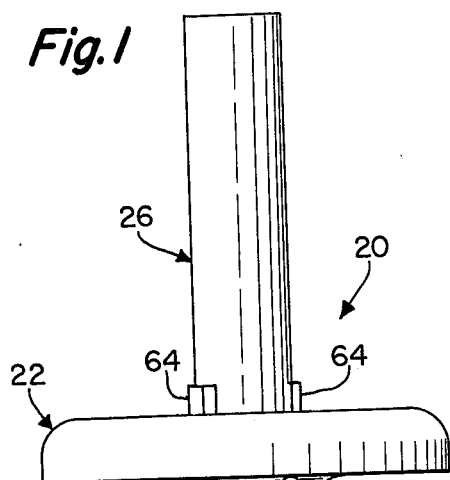
FIG. 1 is an elevational view of an embodiment of the present invention as viewed along line 1—1 of FIG. 2.
Figure 2:
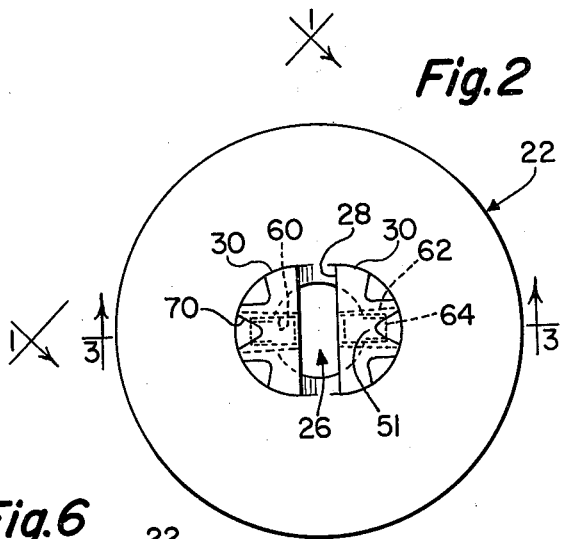
FIG. 2 is a bottom end view of the device shown in FIG. 1.
Figure 6:
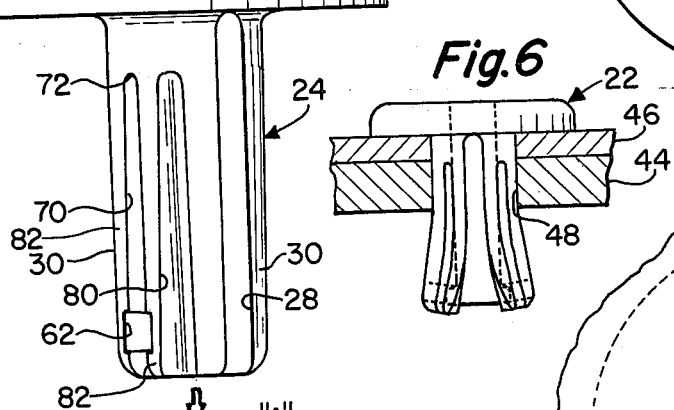
FIG. 6 is an elevational view in partial section of the embodiment shown in FIG. 3 in final expanded and locked position.
Figure 7:
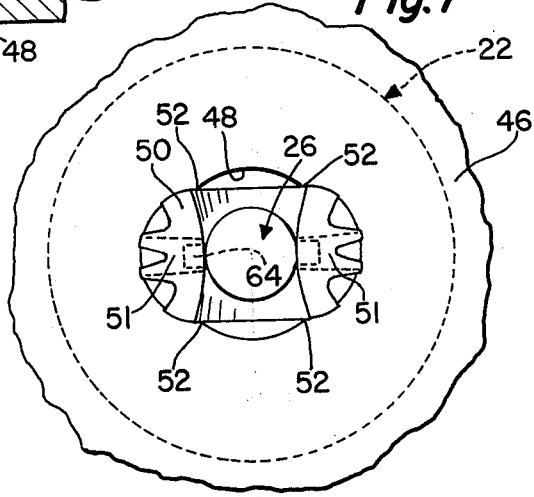
FIG. 7 is a bottom end view in partial section of the rivet shown in FIG. 6 in installed position.

Referring now to the drawing wherein similar parts are designated by similar numerals. A fastener 20 embodying the teachings of the present invention may take the form of a rivet of the type shown in FIG. 1. Such a rivet 20 includes a head 22, a shank 24 and an expander means 26, which in the disclosed embodiment is in the form of a cylindrical drive pin. It will be recognized by those skilled in the art that such a drive pin can be loose or be integrally attached as by the frangible section 54.

The head 22 is shown as a circular flat head, but it will be appreciated that other variations, such as conical head forms and heads carrying attaching means for secondary articles, such as wire clips, molding clips, are contemplated as being capable of attachment or replacement to the basic head 22.

The shank 24, in the illustrated embodiment, includes an axially disposed transverse birfurcation 28 which generally extends from the head to the free extremity of the shank. In the present embodiment this provides two shank portions or prongs 30 which are substantial mirror images of one another and separated by the slot or bifurcation 28. It will be appreciated that while the disclosed embodiment shows two prongs that a multiplicity of prongs greater in number could be utilized for larger sized rivets. A bore 32 traverses the entire shank 24 and the head 22 with the bore having a cylindrical portion 34 adjacent to and traversing the head section and a tapered configuration 36 within the shank portion. The tapered bore surface 36 may have a uniform radius of curvature of varying depth relative to the axis of the fastener or may have a frusto-conical surface configuration. Each prong 30 further includes an axially disposed radial relief means which in this embodiment includes a radially disposed slot 38 having generally parallel side walls and communicating with the bore 34. This slot means 38 extends through the head 22 and into the prongs 30 a distance slightly below the underside of the head 22 where it then tapers inwardly toward the axis of the fastener to form the tapered slot portion 60. It will be noted that the tapered bore 36 in this example has approximately a 6° taper relative to the axis, while the tapered portion 60 of the slot 38 has approximately a 10° taper relative to the axis. A recess or port 62 communicates with the tapered slot 60 generally perpendicular to the axis of the fastener and may extend between the bifurcation 28 and the outer peripheral surface of the fastener prong 30. A pair of substantially rigid lugs 64 extend laterally from the expander means or drive pin 26. The lugs are generally rectangular in cross section and complimentary in width and length to the slot 38 and also complimentary in width to the tapered portion 60, for purposes which will be set forth hereinafter.

The outer surface of the present embodiment also includes a secondary slot 70 which progressively increases in radial depth from its commencement point 72 and thence extends throughout the entire extent of each prong section 30. In this fashion each prong is provided with a reduced thickness which forms a buckle or hinge portion 51 about which the prong 30 may circumferentially expand.

Figure 5:
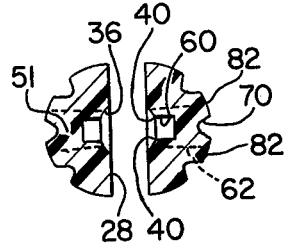
FIG. 5 is a sectional view taken along line 5—5 of FIG. 3.

A plurality of spaced edges 40 are provided in each of the prongs 30 with the edges 40 lying on an imaginary surface defined by the intersection of the tapered bore 36 and slots 38 and 60. These edges 40 will be contacted by the drive pin 26 as it is axially moved through the bore. As can be best seen in FIG. 5, the shank 24 may initially have a generally oval configuration with the slot or bifurcation 28 falling on the minor axis of the oval while the slots 38, 60 and 70 have their center line falling in a plane substantially perpendicular to the other plane and lying on the major axis of the oval, with the major dimension of the shank being equal to or slightly less than the aperture with which it is to be used.

Figure 3:
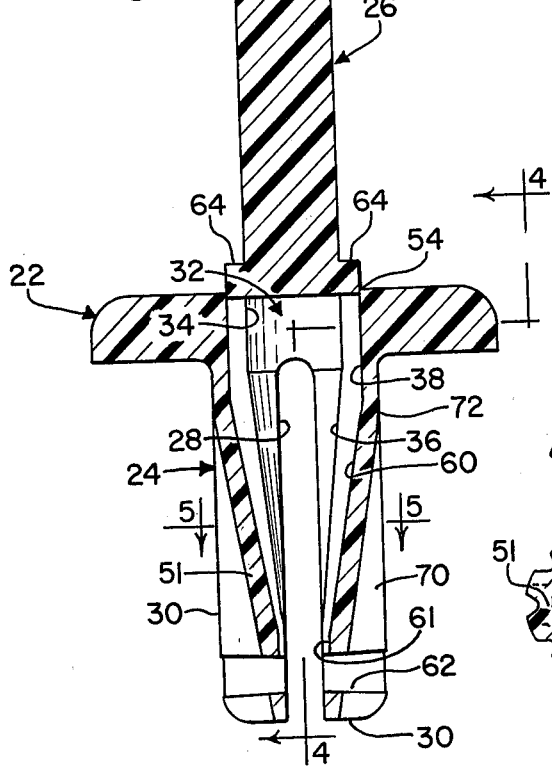
FIG. 3 is an elevational view in partial section taken along line 3—3 in FIG. 2.
Figure 4:
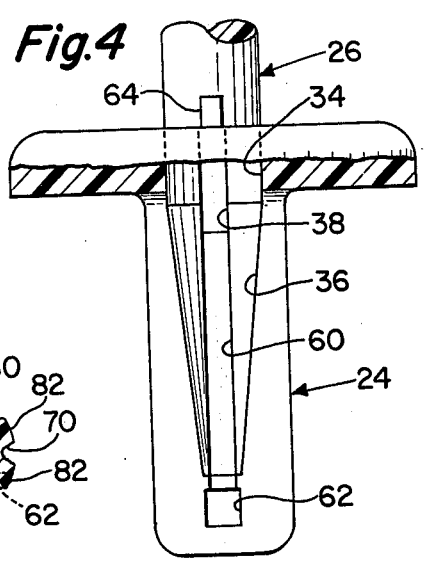
FIG. 4 is a side view in partial section taken along line 4—4 in FIG. 3.

When the rivet is telescoped into the pair of panels 44 and 46 having co-axial apertures 48 passing therethrough, the head 22 is brought to bear against plate 46 with the shank 24 projecting outwardly beyond plate 44. When an axial force is applied to the pin 26 in the direction of the arrow "A," as shown in FIG. 3, an axial movement of the drive pin expander means 26 will shear the frangible portion 54 and move the lugs 64 into the slot 38 while the expander means 26 moves into the cylindrical portion 34 of the bore. It will be noted that the tapered portion 36 of the bore commences axially closer to the head 22 than does the tapered portion 60 of the slot 38. The difference in angular disposition of these two compound surfaces has previously been described. Thus, the tapered portion 60 of the slot is axialy spaced from the commencement of the tapered bore 36 approximately the axial dimension of the lugs 64, thereby permitting the expander 26 to commence expansion radially of the prongs 30 and to open up to bifurcation 28, with the lugs 64 contacting the tapered portion of the slot and aiding in the expansion of the prongs 30. The lugs 64 then progress down the tapered slot 60 through the parallel co-axial portion 61 in the slot until they reach the recesses or ports 62 whence they are captured by springback of the prongs 30 and prevented from further axial movement. The recesses or ports 62 are shown in this embodiment as traversing the entire thickness of the prongs 30. It will be recognized that they can be a blind hole opening from slot 60 and closed to the external periphery; however, each recess or port 62 should provide abrupt shoulder meas for cooperation with lugs 64 to prevent axial dislodgement of pin 26.

While the prongs 30 are moved radially outwardly, the slot 38, with its tapered portion 60, may be opened up or expanded and slot 70 reduced in width or closed so that the side portions 50 of each prong 30 are moved circumferentially or laterally outwardly to additionally overlie the panel. When this occurs, the configuration of the shank 24 is changed from an initially oval configuration to approximately a circular configuration beyond the backside of panel 44 with portions of the prongs adjacent slot 28 intimately engaging the edge of the panel aperture as at points 52.

It will be appreciated that the expander means 26 can be separate or alternatively can be fabricated integrally with the fastener by a frangible section 54 which is readily broken upon application of an axial force as indicated by the arrow A in FIG. 3.

The angular disposition and differences of the tapered portions of the bore and radial relief means are coordinated relative to the diametral extent of the drive pin and lugs to insure retention of radial and circumferential expansion of the prongs when they spring back as the lugs enter the parts.

In accordance with the teachings of the patent to Rapata, U.S. Pat. No. 3,385,157, the shank can be provided with additional slot means 80 which permit the fastener to be utilized in a plurality of various panel thickness tolerances. In addition to the radial expansion of the prongs 30, the lands 82 intermediate the slots 70 and 80 will crush to form secondary shoulder means for retention purposes.

Devices contemplated in the present embodiment can be manufactured by standard injection molding techniques and because of the design of the rivet it is contemplated that the rivet could be economically fabricated on a bank-type mold for the embodiment shown. Other embodiments utilizing the teachings of the present invention will be apparent to those skilled in the art.

I claim:

1. A plastic fastener having a head and an integral bifurcated shank forming at least two shank portions, an axial bore traversing said head and extending throughout said shank, said bore being substantially cylindrical adjacent said head and adapted to accept a complimentary axially moveable drive pin having a predetermined diameter, said bore being tapered and defined within said shank by tapered facing surfaces on said shank portions and said tapered bore having its major diameter terminating at said cylindrical bore adjacent said head, said tapered bore having a substantially uniform radius of curvature of varying depth relative to the axis of said fastener with said radius of curvature being substantially complementary to said pin, each shank portion including an axially disposed radial relief means that extends throughout substantially all of the axial extent of each of said shank portions, said relief means on each shank portion including an axially disposed slot means which is substantially perpendicular to and opens into said bifurcation while extending radially outwardly from said bifurcation at tapering depths for a substantial portion of the axial extent of each shank portion and a second slot means extending radially inwardly from the circumferential outer surface of each shank portion to form between the two tapered slots a thin walled buckle section joining two substantially equal sections of each shank portion, said drive pin which includes at least one laterally extending lug projecting downwardly therefrom and acceptable from axial movement within one of said shank portion slots communicating with said bore, recess means communicating with said one slot adjacent to but spaced from the free end of said shank, said recess means adapted to accept said at least one lug in positive locking relationship when said pin is driven axially in said bore to expand said shank portions.

2. A device of the type claimed in claim 1 wherein said slot includes a uniform radial depth through said head and an adjacent portion of the shank and thence being tapered radially inwardly from said uniform radial depth to a point adjacent the opposite free end of said shank, said recess communicating with the tapered portion of said slot.

3. A device of the type claimed in claim 2 wherein said recess also communicates with the outside peripheral surface of said shank.

4. A device of the type claimed in claim 1 wherein there are two of said lugs extending outwardly in opposite directions from said drive pin.

5. A device of the type claimed in claim 1 wherein said drive means is a pin that is integral with and connected by a frangible section to the head of the fastener.

6. A device of the type claimed in claim 2 wherein there are two of said lugs extending outwardly a predetermined diametral extent in opposite directions from said drive pin, the diametral extent of said tapered portion of said slots at the point where said recesses communicate with said slots being less than said predetermined diametral extent thereby forming positive shoulder means for lockingly engaging said lugs when they fall in said recesses after axial driving of said pin into the bore.

7. A device of the type claimed in claim 2 wherein said slot has a uniform radial depth equal to or greater than the radial extent of said lug, said cylindrical bore meeting the tapered portion of the bore at an axial place closer to said head than the tapered portion of said slot means whereby said drive pin will commence expansion of said shank prior to engagement of said lug with said tapered portion of the slot means to thereby reduce shearing forces applied to said lug as it moves axially through said slot.

8. A device of the type claimed in claim 7 wherein said tapered portion of said slot is axially spaced away from said head and from the commencement of the tapering of said bore a distance at least equal to the axial extent of said lug and said bore in its expanded position after driving of said drive pin will intimately engage in surface contact the outside contour of said pin.

* * * * *